(12) United States Patent
Ottenwess et al.

(10) Patent No.: US 12,283,102 B2
(45) Date of Patent: Apr. 22, 2025

(54) SYSTEM AND METHOD FOR MERGING ASYNCHRONOUS DATA SOURCES

(71) Applicant: STATS LLC, Chicago, IL (US)

(72) Inventors: Alex Ottenwess, Chicago, IL (US); Matthew Scott, Chicago, IL (US); Ken Rhodes, Chicago, IL (US); Patrick Joseph Lucey, Chicago, IL (US)

(73) Assignee: Stats LLC, Chicago, IL (US)

( * ) Notice: Subject to any disclaimer, the term of this patent is extended or adjusted under 35 U.S.C. 154(b) by 0 days.

(21) Appl. No.: 18/407,820

(22) Filed: Jan. 9, 2024

(65) Prior Publication Data

US 2024/0153270 A1   May 9, 2024

Related U.S. Application Data

(63) Continuation of application No. 17/449,697, filed on Oct. 1, 2021, now Pat. No. 11,908,191.
(Continued)

(51) Int. Cl.
*G06V 20/40* (2022.01)
*G06N 3/08* (2023.01)
(Continued)

(52) U.S. Cl.
CPC ............... *G06V 20/42* (2022.01); *G06N 3/08* (2013.01); *G06V 20/63* (2022.01); *G06V 20/70* (2022.01);
(Continued)

(58) Field of Classification Search
None
See application file for complete search history.

(56) References Cited

U.S. PATENT DOCUMENTS 10,997,423 B1   5/2021 Borras
11,501,618 B1 *  11/2022 Siminoff ............... G06V 20/52
(Continued)

OTHER PUBLICATIONS

Bettadapura Vinay Vinaykb@Google Com et al: "Leveraging Contextual Cues for Generating Basketball Highlights", Proceedings of The 2017 ACM on Conference on Information and Knowledge Management, CIKM 1 17, ACM Press, New York, New York, USA, Oct. 1, 2016 (Oct. 1, 2016), pp. 908-917, XP058631062, DOI: 10.1145/2964284.2964286 ISBN: 978-1-4503-4918-5.
(Continued)

*Primary Examiner* — Emily C Terrell
*Assistant Examiner* — Nathan J Bloom
(74) *Attorney, Agent, or Firm* — Bookoff McAndrews, PLLC (57) ABSTRACT

A computing system identifies broadcast video data for a game. The computing system generates tracking data for the game from the broadcast video data using computer vision techniques. The tracking data includes coordinates of players during the game. The computing system generates optical character recognition data for the game from the broadcast video data by applying one or more optical character recognition techniques to each frame of the plurality of frames to extract score and time information from a scoreboard displayed in each frame. The computing system detects a plurality of events that occurred in the game by applying one or more machine learning techniques to the tracking data. The computing system receives play-by-play data for the game. The computing system generates enriched tracking data. The generating includes merging the play-by-play data with one or more of the tracking data, the optical character recognition data, and the plurality of events.

20 Claims, 4 Drawing Sheets

Related U.S. Application Data (60) Provisional application No. 63/086,377, filed on Oct. 1, 2020.

(51) Int. Cl.

| | | |
|---|---|---|
| *G06V 20/62* | (2022.01) | |
| *G06V 20/70* | (2022.01) | |
| *G06V 30/10* | (2022.01) | |
| *G06V 40/20* | (2022.01) | |
| *H04N 21/235* | (2011.01) | |
| *H04N 21/25* | (2011.01) | |
| *H04N 21/44* | (2011.01) | |
| *H04N 21/81* | (2011.01) | |

(52) U.S. Cl.
CPC ......... *G06V 40/20* (2022.01); *H04N 21/2353* (2013.01); *H04N 21/251* (2013.01); *H04N 21/44008* (2013.01); *H04N 21/81* (2013.01); *H04N 21/8133* (2013.01); *G06V 20/44* (2022.01); *G06V 30/10* (2022.01)

(56) References Cited

U.S. PATENT DOCUMENTS

| | | |
|---|---|---|
| 2011/0032361 A1 | 2/2011 | Tamir et al. |
| 2014/0064693 A1 | 3/2014 | Deshpande et al. |
| 2015/0248917 A1 | 9/2015 | Chang et al. |
| 2016/0105733 A1 | 4/2016 | Packard et al. |
| 2017/0155974 A1 | 6/2017 | Stieglitz et al. |
| 2019/0228306 A1 | 7/2019 | Power et al. |
| 2019/0370283 A1 | 12/2019 | Church et al. |
| 2020/0394213 A1 | 12/2020 | Li et al. |
| 2022/0198684 A1* | 6/2022 | Fang ...................... G06T 7/292 |
| 2024/0037953 A1* | 2/2024 | Wang ..................... G06V 20/52 |
| 2024/0152553 A1* | 5/2024 | Nasir ................... G06F 16/7867 |
| 2024/0233387 A1* | 7/2024 | Sriram ................ G06V 10/764 |

OTHER PUBLICATIONS

Extended European Search Report of European Application No. 21876574.1 mailed on Oct. 25, 2024, 14 pages.

Li B, Sezan MI. Event detection and summarization in American football broadcast video. InStorage and Retrieval for Media Databases 2002 Dec. 19, 2001 (vol. 4676, pp. 202-213). SPIE. (Year: 2001).

Li et al., "Bridging the semantic gap in sports video retrieval and summarization", J. Vis. Commun. Image R., vol. 15, doi:10.1016/j.jvcir.2004.08.004, (20040000), pp. 393-424, URL: http://citeseerx.ist.psu.edu/viewdoc/download?doi=10.1.1.616.1386&rep=rep1&type=pdf, (Aug. 12, 2021), XP004578445.

PCT International Application No. PCT/US21/53124, International Search Report and Written Opinion of the International Searching Authority, dated Jan. 19, 2022, 9 pages.

Yu et al., "Automatic Identification and Analysis of Basketball Plays: NBA On-Ball Screens", 2019 IEEE International Conference on Big Data, Cloud Computing, Data Science & Engineering (BCD), (20190529), doi: 10.1109/BCD.2019.8885163, pp. 29-34, XP033652876.

* cited by examiner

SYSTEM AND METHOD FOR MERGING ASYNCHRONOUS DATA SOURCES

This application is a continuation of and claims the benefit of priority to U.S. application Ser. No. 17/449,697 filed on Oct. 1, 2021, which claims priority to U.S. Provisional Application Ser. No. 63/086,377, filed Oct. 1, 2020, the entireties of each of which are incorporated herein by reference which is hereby incorporated by reference in its entirety.

FIELD OF DISCLOSURE

This application generally relates to a system and method for merging asynchronous data sources to generate enriched tracking data.

BACKGROUND

With the proliferation of data, sports teams, commentators, and fans alike are more interested in identifying and classifying events that occur throughout a game or across a season. While companies develop models configured to generate various predictions and metrics, the accuracy of those predictions and metrics is dependent on the accuracy of the data on which the models are trained. While computer-vision technologies provide a sufficient first step for generating such data, computer-vision technologies alone are not enough to achieve the accuracy needed for attaining highly optimized models and results.

SUMMARY

In some embodiments, a method is disclosed herein. A computing system identifies broadcast video data for a game. The broadcast video data includes a plurality of frames. The computing system generates tracking data for the game from the broadcast video data using one or more computer vision techniques. The tracking data includes coordinates of players during the game. The computing system generates optical character recognition data for the game from the broadcast video data by applying one or more optical character recognition techniques to each frame of the plurality of frames to extract score and time information from a scoreboard displayed in each frame. The computing system detects a plurality of events that occurred in the game by applying one or more machine learning techniques to the tracking data. The computing system receives play-by-play data for the game. The play-by-play data is of a different source type than the broadcast video data. The computing system generates enriched tracking data. The generating includes merging the play-by-play data with one or more of the tracking data, the optical character recognition data, and the plurality of events.

In some embodiments, a non-transitory computer readable medium is disclosed herein. The non-transitory computer readable medium includes one or more sequences of instructions, which, when executed by a processor, causes a computing system to perform operations. The operations include identifying, by the computing system, broadcast video data for a game. The broadcast video data includes a plurality of frames. The operations further include generating, by the computing system, tracking data for the game from the broadcast video data using one or more computer vision techniques. The tracking data includes coordinates of players during the game. The operations further include generating, by the computing system, optical character recognition data for the game from the broadcast video data by applying one or more optical character recognition techniques to each frame of the plurality of frames to extract score and time information from a scoreboard displayed in each frame. The operations further include detecting, by the computing system, a plurality of events that occurred in the game by applying one or more machine learning techniques to the tracking data. The operations further include receiving, by the computing system, play-by-play data for the game. The play-by-play data is of a different source type than the broadcast video data. The operations further include generating, by the computing system, enriched tracking data. The generating includes merging the play-by-play data with one or more of the tracking data, the optical character recognition data, and the plurality of events.

In some embodiments, a system is disclosed herein. The system includes a processor and a memory. The memory has programming instructions stored thereon, which, when executed by the processor, causes the system to perform operations. The operations include identifying broadcast video data for a game. The broadcast video data includes a plurality of frames. The operations further include generating tracking data for the game from the broadcast video data using one or more computer vision techniques. The tracking data includes coordinates of players during the game. The operations further include generating optical character recognition data for the game from the broadcast video data by applying one or more optical character recognition techniques to each frame of the plurality of frames to extract score and time information from a scoreboard displayed in each frame. The operations further include detecting a plurality of events that occurred in the game by applying one or more machine learning techniques to the tracking data. The operations further include receiving play-by-play data for the game. The play-by-play data is of a different source type than the broadcast video data. The operations further include generating enriched tracking data. The generating includes merging the play-by-play data with one or more of the tracking data, the optical character recognition data, and the plurality of events.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In nearly every sport, the umpire/referee is the ultimate decision maker in the successful outcome of an event. For example, in basketball whether a basket was a two-point shot or three-point shot (or is valid—a travel did occur or a defensive/offensive foul) is determined by the referee. In soccer, whether a goal is allowed (i.e., if the ball crossed the line, or an infraction did not occur in the lead up play and needs to be revised by VAR) is determined by the umpire as well. As such, to capture these data points, humans normally have to manually annotate these points as they have to wait for the umpire/referee's ultimate adjudication. Even though this process is necessary, in terms of the capturing of the precise moment an event occurred (i.e., frame level), the accuracy of capturing the frame-level precision of these events is extremely inaccurate. For example, in college basketball games, the precision of capturing the precise moment of the event is often seconds off (and sometimes minutes off due to human error) which is suboptimal for any downstream analysis of the data.

Recently, with the advent of computer vision technologies, getting frame level accurate timings of the events has been able to be achieved. Still, human generated event outcomes are required but to minimize the noise associated with "human intervention", leagues such as the NBA have very stringent requirements for human generated annotations to enable an easy merge with the computer vision data. To facilitate this, the computer vision system is normally connected to the live scoreboard (with clock-information), and the humans generating the content are within the venue and input the data into the scoreboard.

However, for situations where the tracking data and clock data are captured from a broadcast stream, and the human generating the human-events is remote and inputting data via another broadcast stream (and often generates imprecise data both in terms of event timings and outcome)—merging and generating the frame-level precise event data is very challenging. The one or more techniques provided herein improves upon conventional systems by providing a method for merging asynchronous data sources.

Figure 1:
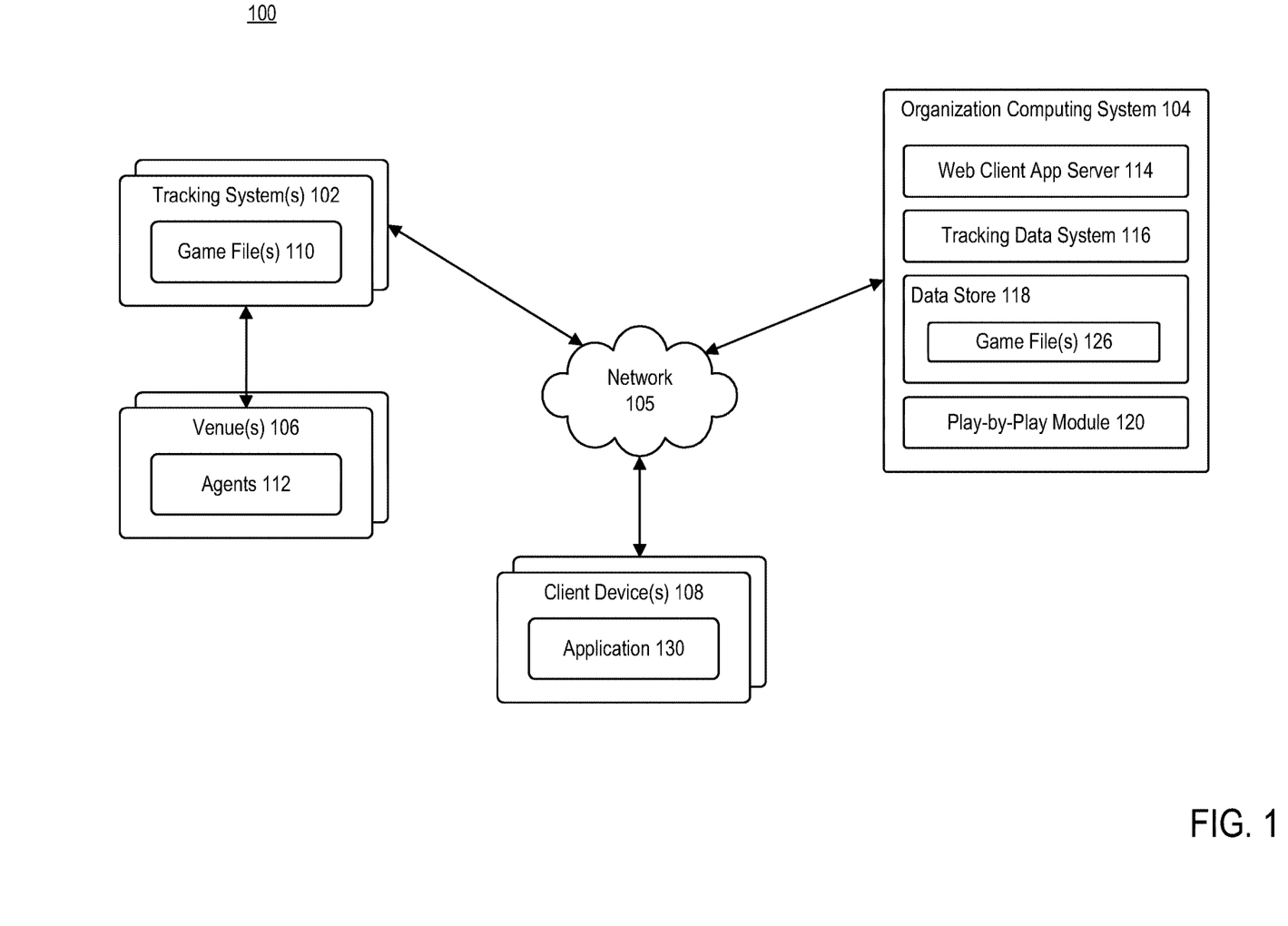
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to capture the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the court (e.g., high sideline view, free-throw line view, huddle view, face-off view, end zone view, etc.).

In some embodiments, tracking system 102 may be used for a broadcast feed of a given match. In such embodiments, each frame of the broadcast feed may be stored in a game file 110.

In some embodiments, game file 110 may further be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. For example, tracking system 102 may be configured to provide organization computing system 104 with a broadcast stream of a game or event in real-time or near real-time via network 105.

Organization computing system 104 may be configured to process the broadcast stream of the game. Organization computing system 104 may include at least a web client application server 114, tracking data system 116, data store 118, and play-by-play module 120. Each of tracking data system 116 and play-by-play module 120 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather than as a result of the instructions.

Tracking data system 116 may be configured to receive broadcast data from tracking system 102 and generate tracking data from the broadcast data. Such techniques assist in tracking data system 116 generating tracking data from the broadcast. For example, tracking data system 116 may perform such processes to generate tracking data across 650,000 college basketball possessions, totaling about 300 million broadcast frames. In addition to such process, organization computing system 104 may go beyond the generation of tracking data from broadcast video data. Instead, to provide descriptive analytics, as well as a useful feature representation for downstream detectors or prediction systems, organization computing system 104 may be configured to map the tracking data to a semantic layer (i.e., events).

Play-by-play module 120 may be configured to receive play-by-play data from one or more third party systems. For example, play-by-play module 120 may receive a play-by-play feed corresponding to the broadcast video data. In some embodiments, the play-by-play data may be representative of human generated data based on events occurring within the game. Even though the goal of computer vision technology is to capture all data directly from the broadcast video stream, the referee, in some situations, is the ultimate decision maker in the successful outcome of an event. For example, in basketball, whether a basket is a 2-point shot or a 3-point shot (or is valid, a travel, defensive/offensive foul, etc.) is determined by the referee. As such, to capture these data points, play-by-play module 120 may utilize manually annotated data that may reflect the referee's ultimate adjudication. Such data may be referred to as the play-by-play feed.

Tracking data system 116 may utilize the play-by-play feed to generate an enriched output by merging the play-by-play data with the raw generated tracking data (which may include the game and shot clock information). As output, tracking data system 116 may generate enriched tracking data that may be utilized by downstream detectors and/or prediction models.

Data store 118 may be configured to store one or more game files 126. Each game file 126 may include video data of a given match. For example, the video data may correspond to a plurality of video frames captured by tracking system 102, the tracking data derived from the broadcast video as generated by tracking data system 116, play-by-play data, and/or enriched data.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 130. Application 130 may be representative of a web browser that allows access to a website or a stand-alone application. Client device 108 may access application 130 to access one or more functionalities of organization computing system 104. Client device 108 may communicate over network 105 to request a webpage, for example, from web client application server 114 of organization computing system 104. For example, client device 108 may be configured to execute application 130 to view predictions or metrics generated by downstream prediction models and/or detectors using the enriched tracking data. The content that is displayed to client device 108 may be transmitted from web client application server 114 to client device 108, and subsequently processed by application 130 for display through a graphical user interface (GUI) of client device 108.

Figure 2:
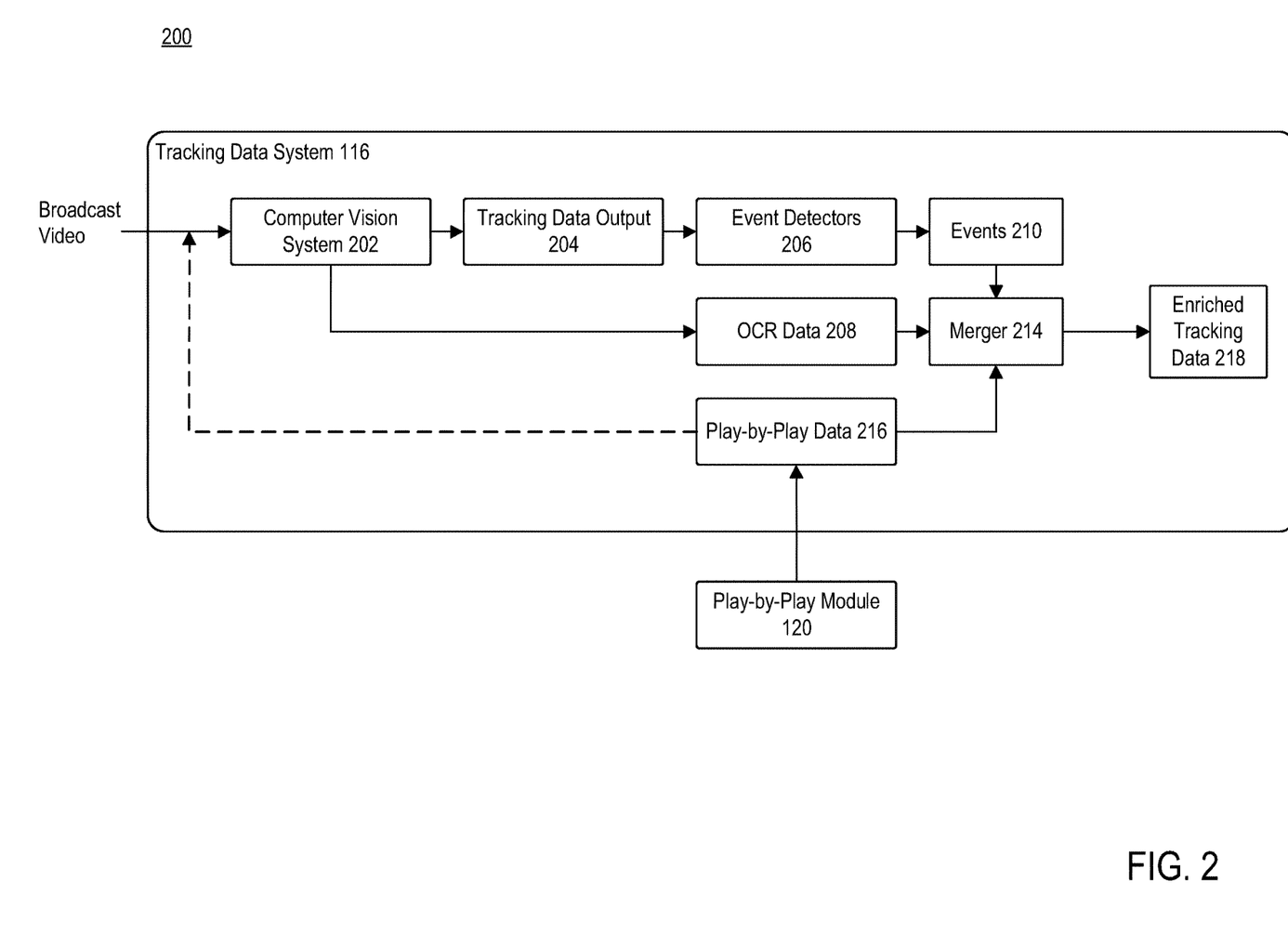
FIG. 2 is a block diagram illustrating tracking data system of the computing system of FIG. 1, according to example embodiments.

FIG. 2 is a block diagram illustrating an exemplary workflow 200 of merging asynchronous data sources, according to example embodiments.

As shown, broadcast video data may be received by tracking data system 116 via computer vision system 202. In some embodiments, computer vision system 202 may be representative of AutoSTATS®, an artificial intelligence and computer vision system configured to derive player-tracking data from broadcast video feeds, commercially available from STATS Perform, headquartered in Chicago, Illinois.

Computer vision system 202 may receive the broadcast video data and perform one or more operations on the broadcast video data to generate tracking data output 204. For example, to generate the tracking data from the broadcast data, computer vision system 202 may map pixels corresponding to each player and ball to dots and may transform the dots to a semantically meaningful event layer, which may be used to describe player attributes. In some embodiments, computer vision system 202 may further categorize each frame of the broadcast video into trackable and non-trackable clips. In some embodiments, computer vision system 202 may further calibrate the moving camera based on the trackable and non-trackable clips. In some embodiments, computer vision system 202 may further detect players within each frame using skeleton tracking. In some embodiments, computer vision system 202 may further track and re-identify players over time. For example, computer vision system 202 may reidentify players who are not within a line of sight of a camera during a given frame. In some embodiments, computer vision system 202 may further detect and track the ball across all frames.

In some embodiments, computer vision system 202 may further utilize optical character recognition techniques. For example, computer vision system 202 may utilize optical character recognition techniques to extract score information and time remaining information from a digital scoreboard of each frame. Such output may be referred to as optical character recognition (OCR) data 208.

As shown, tracking data system 116 may further include event detectors 206. In some embodiments, event detectors 206 may be representative of a plurality of machine learning models, each trained to identify specific events from tracking data output 204. Such events may include, but are not limited to, shots, rebounds, passes, dribbles, possessions, and the like. As output, event detectors 206 may generate a set of events 210.

Tracking data system 116 may further receive play-by-play data 216 from by play-by-play module 120. Play-by-play module 120 may receive play-by-play data 216 from one or more third party systems. For example, play-by-play module 120 may receive play-by-play data 216 corresponding to the broadcast video data. In some embodiments, play-by-play data 216 may be representative of human generated data based on events occurring within the game.

To merge play-by-play data 216 with OCR data 208 and events 210, tracking data system 116 may include a merger 214. Merger 214 may utilize a fuzzy matching algorithm, which may combine play-by-play data, optical character recognition data (e.g., shot clock, score, time remaining, etc.), event data, and play/ball positions (e.g., raw tracking data) to generate the enriched tracking data 218.

Given the unreliable nature of play-by-play data in terms of timing (however, the ordering of events is reliable), merger 214 may first perform coarse matching operations by associating chunks of possessions from the play-by-play data 216 to tracking data output 204. Within that possession chunk, merger 214 may then match play-by-play data 216 to tracking data output 204. For example, merger 214 may analyze the raw tracking data and the automatic event detection output to perform such matching. During such operation, merger 214 may correct erroneous outputs from computer vision system 202, as well as the timing of play-by-play data. Once aligned, tracking data system 116 may be configured to perform various operations on the corrected tracking data. For example, tracking data system 116 may use the play-by-play data to refine the player and ball positions and precise frame of the end of possession events (e.g., shot/rebound location). In some embodiments, tracking data system 116 may further be configured to detect events, automatically, from the corrected tracking data. In some embodiments, tracking data system 116 may further be configured to enhance the events with contextual information using enriched tracking data 218.

In some embodiments, rather than merge play-by-play data 216 with optical character recognition data (e.g., shot clock, score, time remaining, etc.), event data, and play/ball positions (e.g., raw tracking data) to generate the enriched tracking data 218, play-by-play data 216 may be merged at the start of the process (e.g., shown in dashed lines), such as with the broadcast video data prior to the broadcast video data being provided to computer vision system 202. In some embodiments, workflow 200 may include a secondary merge step to refine the merging of the system. In other words, in some embodiments, workflow 200 may include a two-step approach that includes a primary merge of play-by-play data with broadcast video, which may provide tracking data system 116 with important metadata downstream of computer vision system 202; and a secondary, downstream, merge for refinement. Such process may be performed automatically by merger 214 or by a human operator.

For automatic event detection, tracking data system 116 may include a neural network system trained to detect/refine various events in a sequential manner. For example, tracking data system 116 may include an actor-action attention neural network system to detect/refine one or more of: shots, rebounds, passes, dribbles and possessions. Tracking data system 116 may further include a host of specialist event detectors trained to identify higher-level events. Exemplary higher-level events may include, but are not limited to, postups, drives, isolations, ball-screens, handoffs, off-ball-screens, the like. In some embodiments, each of the specialist event detectors may be representative of a neural network, specially trained to identify a specific event type.

While mapping the tracking data to events enables a player representation to be captured, to further build out the best possible player representation, tracking data system 116 may generate contextual information to enhance the detected events. Exemplary contextual information may include defensive matchup information (e.g., who is guarding who at each frame), as well as other defensive information such as coverages for ball-screens.

In some embodiments, to measure defense, tracking data system 116 may use a measure referred to as an "influence score." The influences score may capture the influence a defender may have on each offensive player on a scale of 0-100. In some embodiments, the value for the influence score may be based on basketball defensive principles, such as, but not limited to, proximity to player, distance from basket, passing lanes, lanes to the basket, and the like.

In some embodiments, in addition to assigning frame-level defensive matchups using the influences score, tracking data system 116 may further use the influence score to assign defender roles for the ball-handler and screener for on-ball screens. In some embodiments, tracking data system 116 may further use the influence score to assign defender roles for the cutter and screener for off-ball screens.

In this manner, tracking data system 116 may utilize a computer vision process (i.e., optical character recognition) that may, in parallel, collect scoreboard information from the broadcast that captures the game-clock, shot-clock, period and score and associates this with a broadcast timestamp. Tracking data system 116 may then utilize a human generated stream of information (i.e., play-by-play data 216), which may indicate whether an event that occurred, the player and team that performed the event, as well as a rough approximation of the game-time when it occurred.

Following correction, merger 214 may merge the two corrected streams (i.e., the corrected computer vision outputs (e.g., corrected tracking data output, corrected events data, and/or corrected OCR data) and the corrected play-by-play data) into a single output (e.g., enriched tracking data 218).

In this manner, tracking data system 116 may merge asynchronous data sources (e.g., tracking data output 204, events 210, OCR data 208, and play-by-play data 216) to generate a single output (e.g., enriched tracking data 218) at the frame-level.

Figure 3:
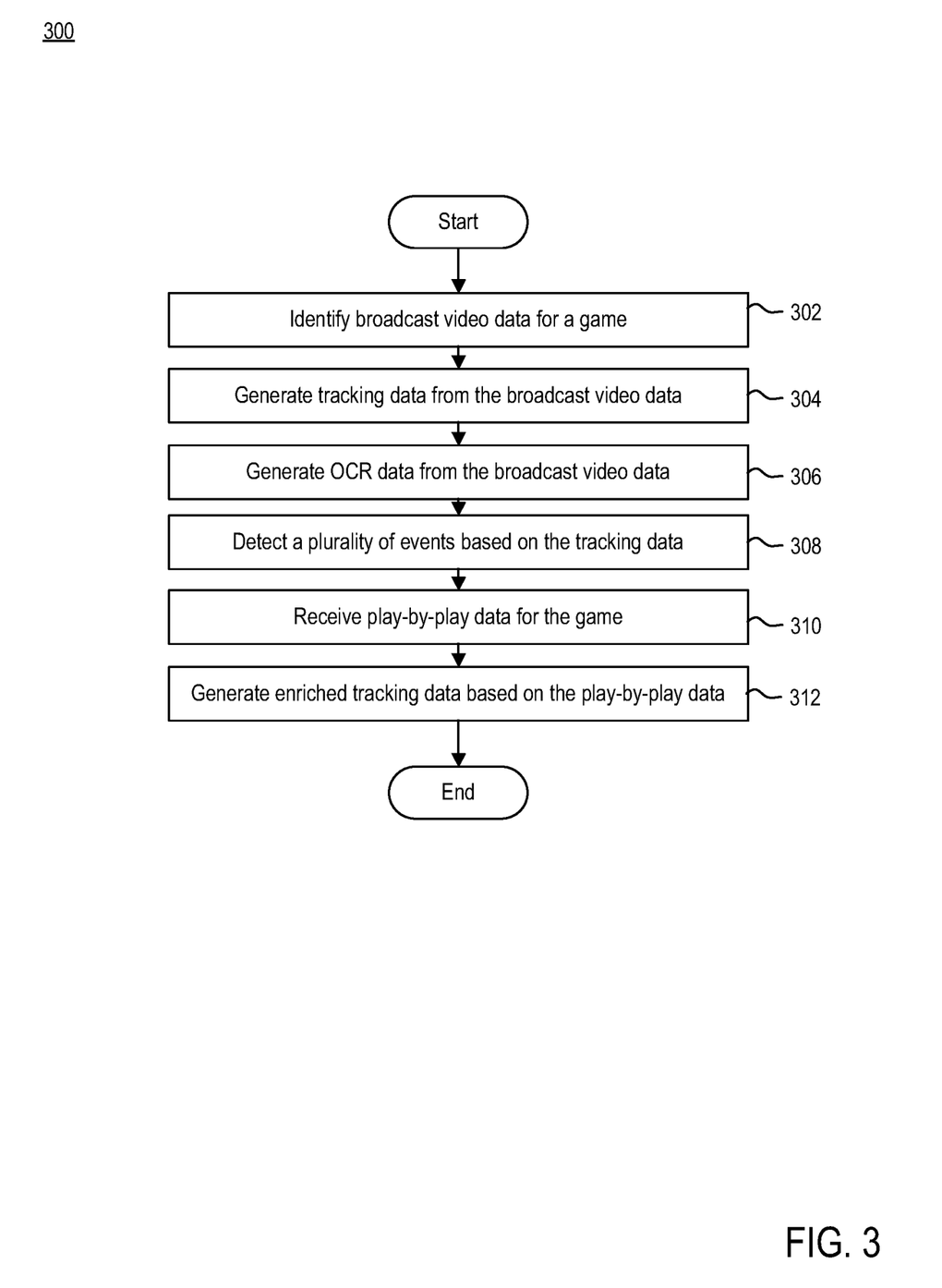
FIG. 3 is a flow diagram illustrating a method of merging asynchronous data sources, according to example embodiments.

FIG. 3 is a flow diagram illustrating a method 300 of generating enriched tracking data, according to example embodiments. Method 300 may begin at step 302.

At step 302, organization computing system 104 may identify broadcast video data for a game. In some embodiments, the broadcast video data may be received from tracking system 102. In some embodiments, the broadcast video data for a game may be stored in data store 118. For example, the broadcast video data may be stored in a game file 126 corresponding to a game or event. Generally, the broadcast video data may include a plurality of video frames. In some embodiments, one or more video frames of the broadcast video data may include data, such as score board data included therein.

At step 304, organization computing system 104 may generate tracking data from the broadcast video data. For example, for each game, tracking data system 116 may use one or more computer vision and/or machine learning techniques to generate tracking data from the broadcast video data. To generate the tracking data from the broadcast data, tracking data system 116 may map pixels corresponding to each player and ball to dots and may transform the dots to a semantically meaningful event layer, which may be used to describe player attributes. For example, tracking data system 116 may be configured to ingest broadcast video received from tracking system 102. In some embodiments, tracking data system 116 may further categorize each frame of the broadcast video into trackable and non-trackable clips. In some embodiments, tracking data system 116 may further calibrate the moving camera based on the trackable and non-trackable clips. In some embodiments, tracking data system 116 may further detect players within each frame using skeleton tracking. In some embodiments, tracking data system 116 may further track and re-identify players over time. For example, tracking data system 116 may re-identify players who are not within a line of sight of a camera during a given frame. In some embodiments, tracking data system 116 may further detect and track the ball across all frames.

At step 306, organization computing system 104 may generate OCR data from the broadcast video data. In some embodiments, tracking data system 116 may utilize one or more OCR techniques to extract data from fames of the broadcast video data. For example, tracking data system 116 may utilize one or more OCR techniques to extract score information and time remaining information from a digital scoreboard displayed in one or more frames of the broadcast video data.

At step 308, organization computing system 104 may detect a plurality of events based on the tracking data. For example, tracking data system 116 may include event detectors 206. In some embodiments, event detectors 206 may be representative of a plurality of machine learning models, each trained to identify specific events from the generated tracking data. Such events may include, but are not limited to, shots, rebounds, passes, dribbles, possessions, and the like. As output, event detectors 206 may generate a set of events corresponding to the tracking data.

At step 310, organization computing system 104 may receive play-by-play data for the game. For example, play-by-play module 120 may receive a play-by-play feed corresponding to the broadcast video data. In some embodiments, the play-by-play data may be representative of human generated data based on events occurring within the game.

At step 312, organization computing system 104 may generate enriched tracking data based on the play-by-play data. To generate enriched tracking data, tracking data system may merge the play-by-play data with the OCR data, the detected events, and/or the raw tracking data. For example, tracking data system 116 may include merger 214. Merger 214 may utilize a fuzzy matching algorithm, which may combine play-by-play data, optical character recognition data (e.g., shot clock, score, time remaining, etc.), event data, and play/ball positions (e.g., raw tracking data) to generate the enriched tracking data.

In some embodiments, tracking data system 116 may perform various operations on the enriched tracking data. For example, tracking data system 116 may detect events, automatically, from enriched tracking data 218. In some embodiments, tracking data system 116 may further enhance the events with contextual information using enriched tracking data 218.

Figure 4A:
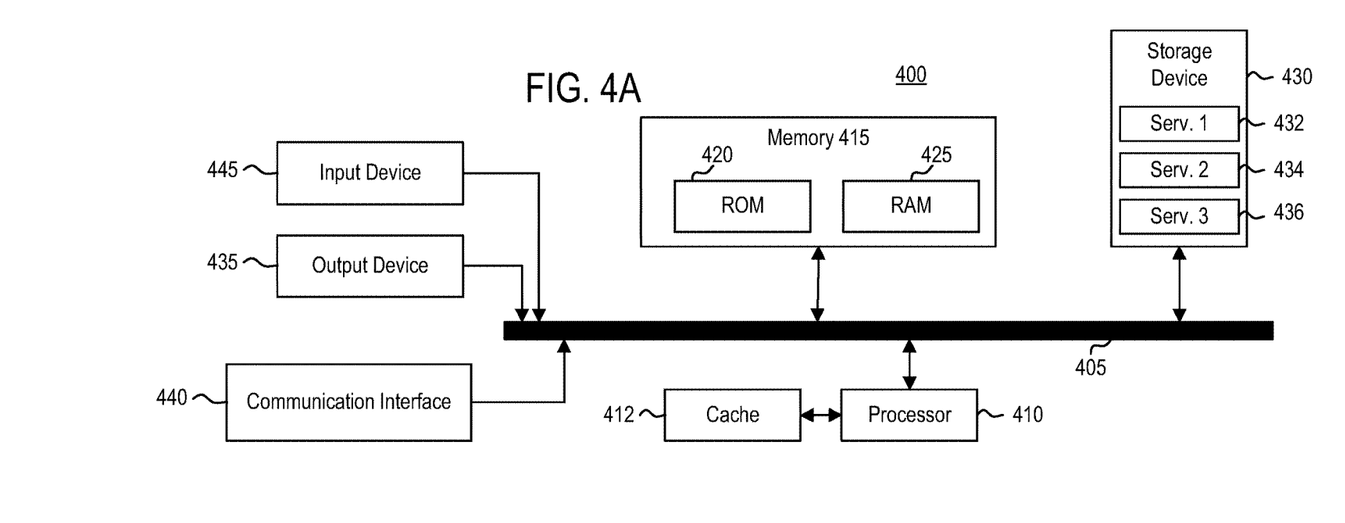
FIG. 4A is a block diagram illustrating a computing device, according to example embodiments.

FIG. 4A illustrates an architecture of computing system 400, according to example embodiments. System 400 may be representative of at least a portion of organization computing system 104. One or more components of system 400 may be in electrical communication with each other using a bus 405. System 400 may include a processing unit (CPU or processor) 410 and a system bus 405 that couples various system components including the system memory 415, such as read only memory (ROM) 420 and random access memory (RAM) 425, to processor 410. System 400 may include a cache of high-speed memory connected directly with, in close proximity to, or integrated as part of processor 410. System 400 may copy data from memory 415 and/or storage device 430 to cache 412 for quick access by processor 410. In this way, cache 412 may provide a performance boost that avoids processor 410 delays while waiting for data. These and other modules may control or be configured to control processor 410 to perform various actions. Other system memory 415 may be available for use as well. Memory 415 may include multiple different types of memory with different performance characteristics. Processor 410 may include any general purpose processor and a hardware module or software module, such as service 1 432, service 2 434, and service 3 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction with the computing system 400, an input device 445 may represent any number of input mechanisms, such as a microphone for speech, a touch-sensitive screen for gesture or graphical input, keyboard, mouse, motion input, speech and so forth. An output device 435 (e.g., display) may also be one or more of a number of output mechanisms known to those of skill in the art. In some instances, multimodal systems may enable a user to provide multiple types of input to communicate with computing system 400. Communications interface 440 may generally govern and manage the user input and system output. There is no restriction on operating on any particular hardware arrangement and therefore the basic features here may easily be substituted for improved hardware or firmware arrangements as they are developed.

Storage device 430 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 425, read only memory (ROM) 420, and hybrids thereof.

Storage device 430 may include services 432, 434, and 436 for controlling the processor 410. Other hardware or software modules are contemplated. Storage device 430 may be connected to system bus 405. In one aspect, a hardware module that performs a particular function may include the software component stored in a computer-readable medium in connection with the necessary hardware components, such as processor 410, bus 405, output device 435, and so forth, to carry out the function.

Figure 4B:
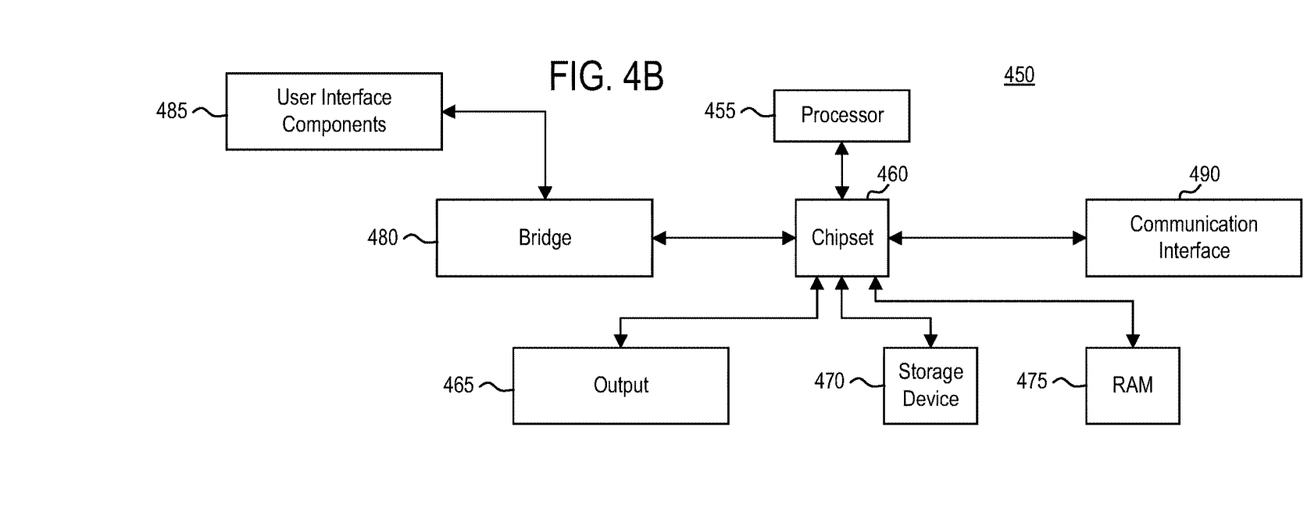
FIG. 4B is a block diagram illustrating a computing device, according to example embodiments.

FIG. 4B illustrates a computer system 450 having a chipset architecture that may represent at least a portion of organization computing system 104. Computer system 450 may be an example of computer hardware, software, and firmware that may be used to implement the disclosed technology. System 450 may include a processor 455, representative of any number of physically and/or logically distinct resources capable of executing software, firmware, and hardware configured to perform identified computations. Processor 455 may communicate with a chipset 460 that may control input to and output from processor 455. In this example, chipset 460 outputs information to output 465, such as a display, and may read and write information to storage device 470, which may include magnetic media, and solid-state media, for example. Chipset 460 may also read data from and write data to RAM 475. A bridge 480 for interfacing with a variety of user interface components 485 may be provided for interfacing with chipset 460. Such user interface components 485 may include a keyboard, a microphone, touch detection and processing circuitry, a pointing device, such as a mouse, and so on. In general, inputs to system 450 may come from any of a variety of sources, machine generated and/or human generated.

Chipset 460 may also interface with one or more communication interfaces 490 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 455 analyzing data stored in storage device 470 or RAM 475. Further, the machine may receive inputs from a user through user interface components 485 and execute appropriate functions, such as browsing functions by interpreting these inputs using processor 455.

It may be appreciated that example systems 400 and 450 may have more than one processor 410 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:
    identifying, by a computing system, broadcast video data for a game, wherein the broadcast video data comprises a plurality of frames;
    generating, by the computing system, tracking data for the game from the broadcast video data using one or more computer vision techniques;
    generating, by the computing system, optical character recognition data for the game from the broadcast video data by applying one or more optical character recognition techniques to each frame of the plurality of frames to extract score and time information from a scoreboard displayed in each frame;
    detecting, by the computing system, a plurality of events that occurred in the game by applying one or more machine learning techniques to the tracking data;
    generating, by the computing system, at least one semantic layer, wherein the semantic layer is generated based on the tracking data;
    generating, by the computing system, at least one player attribute for at least one player, wherein the at least one player attribute is based on a mapping included in the semantic layer;
    receiving, by the computing system, play-by-play data for the game; and
    generating, by the computing system, enriched tracking data, the generating comprising merging the play-by-play data with one or more of the player attribute and one or more of the tracking data, the optical character recognition data, and the plurality of events.

2. The method of claim 1, further comprising:
    merging the play-by-play data with the broadcast video data prior to generating the tracking data.

3. The method of claim 1, wherein generating, by the computing system, the enriched tracking data comprises:
    correcting erroneous outputs in the tracking data or the plurality of events based on information in the play-by-play data.

4. The method of claim 1, wherein generating, by the computing system, the enriched tracking data comprises:
    segmenting the tracking data into a plurality of possessions; and
    matching portions of the play-by-play data to the plurality of possessions based on at least one of the tracking data and the plurality of events.

5. The method of claim 1, wherein generating, by the computing system, the enriched tracking data comprises:
    refining player and ball precisions in each frame of a respective broadcast video.

6. The method of claim 1, wherein the tracking data comprises coordinates of players during the game.

7. The method of claim 1, wherein the tracking data comprises coordinates of a ball during the game.

8. The method of claim 1, further comprising:
    automatically detecting, via a neural network, one or more additional events in each frame of a respective broadcast video; and
    enhancing, by the computing system, the detected one or more additional events with contextual information.

9. A non-transitory computer readable medium comprising one or more sequences of instructions, which, when executed by a processor, causes a computing system to perform operations comprising:
    identifying, by a computing system, broadcast video data for a game, wherein the broadcast video data comprises a plurality of frames;
    generating, by the computing system, tracking data for the game from the broadcast video data using one or more computer vision techniques;
    generating, by the computing system, optical character recognition data for the game from the broadcast video data by applying one or more optical character recognition techniques to each frame of the plurality of frames to extract score and time information from a scoreboard displayed in each frame;
    detecting, by the computing system, a plurality of events that occurred in the game by applying one or more machine learning techniques to the tracking data;
    generating, by the computing system, at least one semantic layer, wherein the semantic layer is generated based on the tracking data;
    generating, by the computing system, at least one player attribute for at least one player, wherein the at least one player attribute is based on a mapping included in the semantic layer;
    receiving, by the computing system, play-by-play data for the game; and
    generating, by the computing system, enriched tracking data, the generating comprising merging the play-by-play data with one or more of the player attribute and one or more of the tracking data, the optical character recognition data, and the plurality of events.

10. The non-transitory computer readable medium of claim 9, wherein generating, by the computing system, the enriched tracking data comprises:
    correcting erroneous outputs in the tracking data or the plurality of events based on information in the play-by-play data.

11. The non-transitory computer readable medium of claim 9, wherein generating, by the computing system, the enriched tracking data comprises:
    segmenting the tracking data into a plurality of possessions; and
    matching portions of the play-by-play data to the plurality of possessions based on at least one of the tracking data and the plurality of events.

12. The non-transitory computer readable medium of claim 9, wherein generating, by the computing system, the enriched tracking data comprises:
    refining player and ball precisions in each frame of a respective broadcast video.

13. The non-transitory computer readable medium of claim 9, wherein the tracking data comprises coordinates of players during the game.

14. The non-transitory computer readable medium of claim 9, wherein the tracking data comprises coordinates of a ball during the game.

15. The non-transitory computer readable medium of claim 9, further comprising:
    automatically detecting, via a neural network, one or more additional events in each frame of a respective broadcast video; and
    enhancing, by the computing system, the detected one or more additional events with contextual information.

16. A system comprising:
    a processor; and
    a memory having programming instructions stored thereon, which, when executed by the processor, causes the system to perform operations comprising:
        identifying, by a computing system, broadcast video data for a game, wherein the broadcast video data comprises a plurality of frames;
        generating, by the computing system, tracking data for the game from the broadcast video data using one or more computer vision techniques;
        generating, by the computing system, optical character recognition data for the game from the broadcast video data by applying one or more optical character recognition techniques to each frame of the plurality of frames to extract score and time information from a scoreboard displayed in each frame;
        detecting, by the computing system, a plurality of events that occurred in the game by applying one or more machine learning techniques to the tracking data;
        generating, by the computing system, at least one semantic layer, wherein the semantic layer is generated based upon the tracking data;
        generating, by the computing system, at least one player attribute for at least one player, wherein the at least one player attribute is based upon the semantic layer;
        receiving, by the computing system, play-by-play data for the game, wherein the play-by-play data is of a different source type than the broadcast video data; and
        generating, by the computing system, enriched tracking data, the generating comprising merging the play-by-play data with one or more of the player attribute and one or more of the tracking data, the optical character recognition data, and the plurality of events.

17. The system of claim 16, wherein generating the enriched tracking data comprises:
    correcting erroneous outputs in the tracking data or the plurality of events based on information in the play-by-play data.

18. The system of claim 16, wherein generating the enriched tracking data comprises:
    segmenting the tracking data into a plurality of possessions; and
    matching portions of the play-by-play data to the plurality of possessions based on at least one of the tracking data and the plurality of events.

19. The system of claim 16, wherein generating the enriched tracking data comprises:
    refining player and ball precisions in each frame of a respective broadcast video.

20. The system of claim 16, further comprising:
    automatically detecting, via a neural network, one or more additional events in each frame of a respective broadcast video; and
    enhancing, by the computing system, the detected one or more additional events with contextual information.

* * * * *

UNITED STATES PATENT AND TRADEMARK OFFICE
CERTIFICATE OF CORRECTION

PATENT NO. : 12,283,102 B2
APPLICATION NO. : 18/407820
DATED : April 22, 2025
INVENTOR(S) : Alex Ottenwess et al.

Page 1 of 1

It is certified that error appears in the above-identified patent and that said Letters Patent is hereby corrected as shown below:

In the Specification

In Column 1, at Lines 9-10, delete "reference which is hereby incorporated by reference in its entirety" and insert --reference--.

Signed and Sealed this
Tenth Day of June, 2025

Coke Morgan Stewart
*Acting Director of the United States Patent and Trademark Office*